Dec. 21, 1926.  
C. MAURUS  
1,611,544
FISHHOOK DISLODGER
Filed April 14, 1926
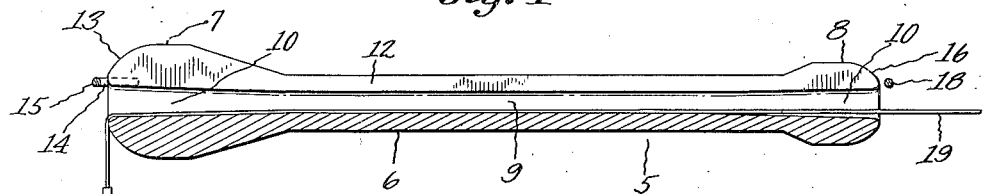
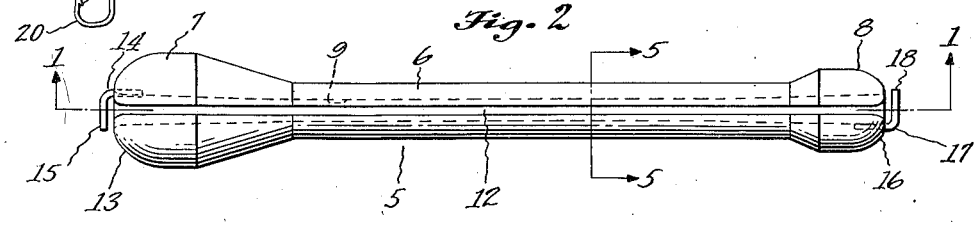
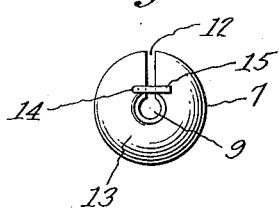
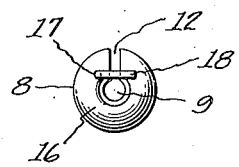
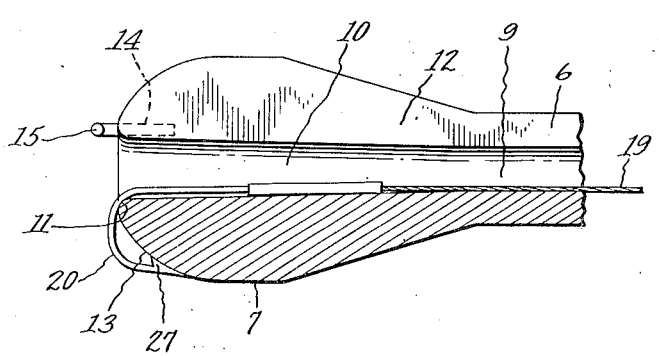
INVENTOR  
Carl Maurus  
By John A. Boumhardt  
Atty.

Patented Dec. 21, 1926.

1,611,544

UNITED STATES PATENT OFFICE.

CARL MAURUS, OF CLEVELAND, OHIO, ASSIGNOR OF ONE-HALF TO JOHN J. COATES, OF CLEVELAND, OHIO.

FISHHOOK DISLODGER.

Application filed April 14, 1926. Serial No. 101,968.

This invention relates to new and useful improvements in fish-hook dislodgers providing means for easily and quickly dislodging fish from fishing-line hooks of various sizes, avoiding the usual necessity of dislodging the hook by holding the fish in one hand and manipulating the hook loose with the other hand, which often results in injury to the hand by the sharp fins of the fish.

Other objects and features of the invention will be hereinafter pointed out and described.

In the drawings:—

Figure 1 is a sectional side view of the dislodger on line 1—1 of Fig. 2, showing the application thereof to a fishing line.

Fig. 2 is a plan view of the device.

Fig. 3 is an end view of the larger hook dislodging head.

Fig. 4 is an end view of the smaller hook dislodging head.

Fig. 5 is a sectional view on line 5—5 of Fig. 2.

Fig. 6 is an enlarged detail sectional view showing the fish-hook pulled by means of the fishing-line into fish dislodging engagement with a dislodger head.

Referring specifically to the drawings, 5 indicates generally the body of the dislodger which has a cylindrical handle portion 6 with integral fish dislodging heads 7 and 8 of different size at each end thereof. A longitudinally extending central bore 9 through the body 5 is slightly flared at the ends as at 10 and rounded as at 11 and opens into a slot 12 in the body. The larger dislodger head 7 is rounded at the end as at 13 and is provided with an L-shaped guard 14 secured thereto with its free end 15 extending across slot 12 and spaced from the head. The smaller dislodger head 8 is rounded at the end as at 16 and is provided with an L-shaped guard 17 secured thereto oppositely to guard 14 with its free end 18 extending across slot 12 and spaced from the head.

The dislodger may be positioned on the fishing-line for dislodging the hook from a fish by inserting the fishing-line indicated at 19 through slot 12 into central bore 9 carrying the fishing-line around the oppositely extending guard ends 15 and 18 which retain the line in bore 9. The fishing line is then pulled through bore 9 drawing the hook 20 taut on the head 7 with the inner side of the hook barb 21 frictionally engaging the rounded end 13 cutting or forcing the fish tissue thereon loose, releasing the hook from the fish. Where the fish-hook is rather deeply imbedded in the tissue the barb may be frictionally worked over the rounded dislodger head by tugging on the fishing line cutting and tearing the tissue loose, or the dislodger head with the hook drawn tight may be pushed forcing the barb loose from the tissue.

The device is very useful and convenient for fishing purposes, has no working parts to get out of order, is inexpensive and easy to carry about.

While I have shown and described one embodiment of the invention, obviously various changes in the details of construction and proportions may be made without departing from the spirit and scope of the appended claims.

I claim:

1. A fish hook dislodger comprising a body having a longitudinal bore, a longitudinal slot in the side of the body communicating with said bore, and line guards at the outer ends of said slot, beyond the ends of the body.

2. A fish hook dislodger comprising a body having a longitudinal bore, a longitudinal slot in the side of the body communicating with said bore, and line guards, said body having enlarged and rounded ends and said guards being located at the outer ends of said slot, beyond the ends of the body.

3. A fish hook dislodger comprising a substantially cylindrical body having a longitudinal slot in the side thereof, and guards adapted to prevent accidental passage of a fishing line through said slot, said guards being substantially L-shaped and being mounted on the ends of said body adjacent said slot.

In testimony whereof, I do affix my signature.

CARL MAURUS.